United States Patent [19]
Grossman et al.

[11] 3,787,761
[45] Jan. 22, 1974

[54] METHOD OF DETECTING MAGNETIC ADDITIVES IN NUCLEAR FUEL MATERIAL BY NOTING CHANGE IN WEIGHT OF MATERIAL WHEN WEIGHED IN A MAGNETIC FIELD

[75] Inventors: Leonard N. Grossman, Livermore; Douglas R. Packard, Sunol, both of Calif.

[73] Assignee: General Electric Company, San Jose, Calif.

[22] Filed: May 15, 1972

[21] Appl. No.: 253,298

[52] U.S. Cl.............. 324/34 R, 73/433, 176/19 R, 177/50, 177/DIG. 5, 324/34 S
[51] Int. Cl............................................. G01r 33/12
[58] Field of Search........ 324/34 R, 34 S; 176/19 R; 177/50, DIG. 5; 73/433

[56] References Cited
UNITED STATES PATENTS
3,221,152  11/1965  Jones................................. 73/433 X
3,299,348  1/1967  Beauxis, Jr. et al................ 324/34 S
3,502,162  3/1970  Munson................................ 177/50

*Primary Examiner*—Robert J. Corcoran
*Attorney, Agent, or Firm*—Ivor J. James, Jr. et al.

[57] ABSTRACT

A rapid, non-destructive method of detecting additives in a qualitative and a quantitative manner in a nuclear fuel material is disclosed. This method is based upon the magnetic susceptibility of certain additives in nuclear fuel which are monitored for quality control purposes. The method gives a comparison of the weight of the nuclear fuel material versus the weight of the nuclear fuel material when disposed in a magnetic field. This enables a calculation of the change in weight of the nuclear fuel material in the presence of a magnetic field for comparison with a calibration of weight changes for known additions of the additive. In a particularly preferred embodiment of the invention, a method is used for the non-destructive qualitative and quantitative detection of gadolinium, a burnable poison additive in nuclear fuel materials.

10 Claims, 4 Drawing Figures

METHOD OF DETECTING MAGNETIC ADDITIVES IN NUCLEAR FUEL MATERIAL BY NOTING CHANGE IN WEIGHT OF MATERIAL WHEN WEIGHED IN A MAGNETIC FIELD

BACKGROUND OF THE INVENTION

The release of large amounts of energy through nuclear fission reactions is now well-known. Briefly, a fissile atom, such as U-235, absorbs a neutron in its nucleus and undergoes a nuclear disintegration which produces on the average two fission products of lower atomic weight with great kinetic energy and several neutrons also of high energy. The energy is dissipated as heat in the fuel elements of the reactor. This heat may be removed by passing a coolant in heat exchange relation to the fuel and the heat can be extracted from the coolant to perform useful work.

If a nuclear reactor is to operate at a steady state power level, the fission inducing neutron population must remain constant. That is each fission must produce a net of one neutron which induces a subsequent fission so that the fission reaction is self-sustaining. Thus, for steady state operation of the reactor system, the neutron reproduction ratio or effective multiplication factor, $k_{eff}$ (defined as the ratio of the neutron population at a given time to the neutron population one finite neutron lifetime earlier) must be at unity, at which time the system is said to be "just critical." In commonly used nuclear fuel materials, fertile materials such as U-238 are included in addition to the fissile atoms. However, in a thermal reactor (a reactor in which most of the fissions are caused by thermal neutrons) the rate of production of fissile atoms is less than the rate of fissile atom consumption. Thus as the neutron-fission chain reaction proceeds the nuclear fuel is depleted, that is the number of neutrons of fissile material decreases. In addition, some of the fission products such as xenon and samarium are neutron absorbers or "poisons." Thus if the reactor is to have a reasonable lifetime of power generation the fuel core must include an initial excess of nuclear fuel which results in an initial excess of reactivity. The excess reactivity may be defined as the amount by which the uncontrolled multiplication factor exceeds unity. This excess reactivity requires a control system of sufficient strength to maintain the effective multiplication factor at unity during reactor operation. The control system customarily comprises neutron absorbing or poison materials that serve to control the neutron population by non-fission absorption or capture of neutrons. Typically the control system includes mechanical control in the form of a plurality of selectively actuatable, poison containing control rods or the like which can be inserted into and withdrawn from the core as required. Even more typically, the control system includes additives disposed with the nuclear fuel material such as by coating or incorporating the additive into the nuclear fuel material. These additives are called burnable poisons and various types and forms of burnable poisons have been suggested for use in nuclear reactors to control the excess reactivity. A burnable poison is a neutron absorber which is converted by neutron absorption such that its control worth (neutron absorbing capability) decreases with exposure to a neutron flux. The use of burnable poisons decreases the amount of mechanical control required, and it has long been recognized that burnable poisons offer the promise of an automatic control of excess reactivity if the decrease in excess reactivity with power operation or exposure of the nuclear core can be matched by the decrease in control worth of the burnable poison. Also appropriate arrangements for burnable poisons provide the possibility of improved core performance by improvement in power distribution.

Since burnable poisons are incorporated in nuclear fuel materials during manufacturing processes it has been recognized that it is desirable for purposes of quality control and for identification purposes during nuclear fuel material manufacture to have a rapid non-destructive method of measuring the burnable poison content of fuel powders, pellets and fuel rods. Since gadolinium is one of the most widely used burnable poisons in nuclear fuel materials, it is particularly desirable for quality control and identification purposes in nuclear fuel manufacture to be able to measure the gadolinium content of fuel powders, pellets and rods.

OBJECTS OF THE INVENTION

It is an object of this invention to provide a rapid, non-destructive method of detecting additives having magnetic susceptibility in a nuclear fuel material.

It is another object of this invention to provide a rapid, non-destructive method of measuring the amount of additives having magnetic susceptibility in a nuclear fuel material.

Still another object of this invention is to provide a method of detecting the presence and concentration of burnable poisons which have high magnetic susceptibility in nuclear fuel materials.

Another object of this invention is to provide a rapid, non-destructive method of detecting and measuring the magnetically susceptible additives in nuclear fuel materials which method is operative regardless of the composition of the nuclear fuel material.

An especially preferred object of this invention is to provide a rapid, non-destructive method of detecting and measuring the amount of gadolinium in a nuclear fuel material in powder form, pellet form or in assembled fuel elements.

A further object of this invention is to provide a rapid, non-destructive method of detecting ferromagnetic impurities in a nuclear fuel material in powder form, pellet form or in assembled fuel elements.

SUMMARY OF THE INVENTION

These and other objects are achieved in accordance with the teaching of this invention by determining the change in weight of a nuclear fuel material when it is exposed to a magnetic field. The method gives a comparison of the weight of the nuclear fuel material versus the weight of the nuclear fuel material disposed in a magnetic field. This enables a calculation of the change in weight of the nuclear fuel material in the presence of a magnetic field. Since the processing history of the nuclear fuel material is known, the change in weight in the nuclear fuel material can be compared to calibrated standards for the particular additive in the nuclear fuel material. This gives a reading disclosing the presence of the additive and the concentration of the additive within the accuracy of the magnetic field applied to the nuclear fuel material.

DRAWINGS

DESCRIPTION

Figure 1:
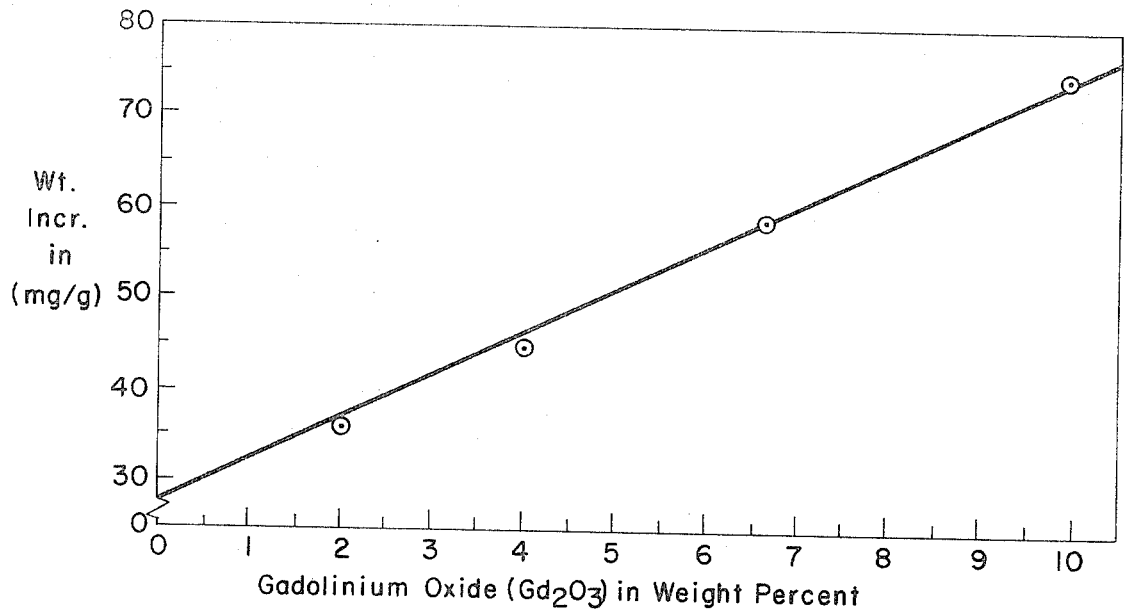
FIG. 1 is a graph presenting the weight change caused by a magnetic field for uranium dioxide pellets containing an additive of gadolinium oxide.

As discussed more fully hereinafter, several of the burnable poison additives which are incorporated in nuclear fuel materials exhibit a phenomenon of magnetic susceptibility or ferromagnetism which is in marked contrast to the magnetic susceptibility or ferromagnetism of the other components forming zircaloy-fuel elements, typically the uranium isotopes, the plutonium isotopes and ziecaloy-2 cladding. As used in the description of this invention, a fuel element consists of a nuclear fuel material in a suitable form such as a powder or pellets enclosed within a corrosion-resistant non-reactive cladding which is sealed on each end with an end plug usually of the same composition as the cladding. The fuel elements are grouped together at fixed distances from each other in a coolant flow channel or region as a fuel assembly and sufficient fuel assemblies are combined to form the nuclear reactor core capable of a self-sustained fission reaction.

It has now been surprisingly discovered that the magnetic susceptibility or ferromagnetism of additives in nuclear fuel materials in comparison to the magnetic susceptibility of the nuclear fuel material and the cladding in which the nuclear fuel material is contained is such that a method for the non-destructive qualitative and quantitative detection of such additives in the nuclear fuel materials can be practiced with reliability. This method entails the step of establishing the weight of the nuclear fuel material, the step of establishing the weight of the nuclear fuel material disposed in a magnetic field, and the step of calculating the changes in weight of the specimen in the presence of a magnetic field to enable comparison of the increase in weight with the calibration of weight increases for known additions of the additives being considered. In the practice of this method the fabrication history of the nuclear fuel material being analyzed is important since from this history the additive(s) one is checking in a qualitative and quantitative manner will be known. Thus the calibration of weight changes for given amounts of a particular additive in a nuclear fuel material will be used for comparison purposes.

For example, when the fabrication history of a nuclear fuel material indicates that additions of a burnable poison such as a gadolinium compound have been added to the nuclear fuel material during fabrication, the weight difference determined from the practice of this method would be compared with a calibration standard for a burnable poison of gadolinium. In effect any substantial indication of a weight difference from the practice of this method would show that a gadolinium compound was present in the nuclear fuel material and comparison of the weight difference with the calibration standard would enable the quantitative determination of the gadolinium additive in the nuclear fuel material.

This invention can be utilized with various forms of nuclear fuel materials which contain at least one fissionable isotope. A person skilled in the art will realize that nuclear fuel in elemental or compound forms, such as oxides, carbides, borides, nitrides and mixtures thereof as well as other ceramic compounds of fissionable isotopes, are comprehended in the practice of this invention. In one particular preferred practice of this invention, the nuclear fuel material is in the form of an oxide composition of uranium since this type of composition is particularly popular for generation of electrical power by nuclear fission chain reactions.

In a nuclear fuel material comprising either an elemental or compound form of uranium, plutonium, thorium or mixtures of the foregoing, various additives have been suggested to impart particular properties to the nuclear fuel material during nuclear fission chain reactions or to aid in the preparation of the nuclear fuel materials for use in nuclear reactors. Where these additives have sufficient magnetic susceptibility or ferromagnetic properties, it is possible to use this magnetic response to detect the additive and to characterize the amount of additive present in a nuclear fuel material, either alone or as contained in a cladding, since the nuclear fuel material and the cladding commonly used have a very low magnetic susceptibility. Representative of the additives having sufficient magnetic susceptibility or ferromagnetic properties which can be readily detected by the practice of the method of this invention are burnable poisons of gadolinium in elemental and compound form including gadolinium oxide ($Gd_2O_3$), dysprosium in elemental and compound form including dysprosium oxide ($Dy_2O_3$), europium in elemental and compound form including europium oxide ($Eu_2O_3$), and erbium in elemental and compound form including erbium oxide ($Er_2O_3$). Other additives that can be detected in elemental or compound form by the method of this invention include iron, nickel, manganese, holmium, cobalt, terbium, and thulium. Plutonium is detectable by this method when it is the only additive having any appreciable magnetic susceptibility in a nuclear fuel material.

The practice of this invention utilizes the difference in magnetic response of the foregoing burnable poison additives and ferromagnetic additives or impurities in the nuclear fuel material in comparison with the magnetic response of the other components of the nuclear fuel material. The magnetic susceptibility of $UO_{2+x}$ (with $x$ varying from about 0.03 to about 0.17) has been measured and is relatively insensitive to the oxygen content of the nuclear fuel or the temperature at which it is measured. The magnetic susceptibility of the foregoing burnable poison additives has also been measured with values substantially higher than those for uranium oxides. Theoretical considerations indicate that the measurement of magnetic susceptibility for nuclear fuel materials should not be affected to any noticeable extent by inhomogeneity of a solid solution or even segregation of the foregoing additives within the nuclear fuel material. Microstructure, enrichment and impurity levels normal to nuclear fuel materials have a minimal effect on the accuracy of the measurement. Effect of temperature changes on a measurement of magnetic susceptibility of a nuclear fuel material is negligible.

Accordingly it is the practice of this invention to apply a magnetic field sufficient to produce magnetic force on a specimen being tested to enable an accurate determination in the qualitative and quantitative manner of the amount of the additive(s) in the nuclear fuel material in light of the fabrication history of the nuclear fuel material. For a specimen weighing about 1 gram with about 2 weight percent $Gd_2O_3$ in a magnetic field of about 2,500 gauss or higher suitable results are achieved with an approximate accuracy of ± 0.3 weight percent or less of the additive. Any instrument producing such magnetic fields can be utilized in the practice of this invention with electromagnets being such a commonly available instrument. It is preferred to use a constant gradient magnet as it would be possible to have slight physical movements of the specimen during the determination of the weight of the nuclear fuel material in the magnetic field without affecting the accuracy of the measurement. However a constant field electromagnet may also be employed, and with this type of magnet, the nuclear fuel material is positioned at the approximate point of the occurrence of the maximum field gradient in the magnetic field.

The change in weight of the nuclear fuel material in the magnetic field could either be a gain in weight or a loss in weight depending upon the position of the fuel material in relation to the magnet. For example, if the nuclear fuel material placed on a balance contains a burnable poison additive and is positioned slightly above the magnet, there will be a gain in weight due to the magnetic force pulling down on the nuclear fuel material. If the fuel material placed on a balance contains a burnable poison additive and is positioned slightly below the magnet, there will be a loss in weight due to the magnetic force pulling upon the nuclear fuel material. The nuclear fuel material is positioned at the same point in the magnetic field as was the calibration standard.

The person skilled in the art will realize several striking advantages from the method presented in this invention. In particular he will realize that it is possible to practice qualitative control and quantitative control on nuclear fuel materials, in powder form, pellet form and as assembled in fuel elements. Such quality control can be practiced in a non-destructive sense, that is, if the nuclear fuel material passes the test it can be utilized in nuclear reactors. Further the equipment involved in the practice of this method is inexpensive, is commonly available, requires low maintenance and is easy to operate. Further the practice of the method of this invention gives a rapid determination so that the invention is readily automated and capable of being incorporated in fuel assembly lines in the manufacture of nuclear fuel materials for use in nuclear reactors. Comparisons of weight change of specimens with a calibration standard can be computerized.

The following examples show that additives have been measured in nuclear fuel materials with an approximate accuracy of ± 0.3 weight percent. The measurement of the additive content was not affected by surrounding the fuel with a metallic cladding of zircaloy and the ease of measurement is such that a routine production line detection device could be incorporated in normal production practices.

EXAMPLES 1 – 5

Five sintered pellets of $UO_2$ with varying amounts of $Gd_2O_3$ were prepared by powder blending, compacting the powder into a green cylindrical shape and sintering in dry hydrogen according to current manufacturing procedures. The pellets were cylinders 1.016 cm in height and 0.576 cm in diameter, with weights and compositions given in Table 1.

A recording balance was placed on a platform above a Dings (brand) constant field horseshoe electromagnet capable of producing approximately 9,000 gauss between the pole faces. A string attached to a gelatin crucible was suspended from the balance so that the crucible was above the center of the field in a field of approximately 2,500 gauss. At this position the magnetic field was decreasing rapidly with respect to increasing height from the center of the field (roughly 500 gauss-$cm^{-1}$). The technique used is known as the Faraday method.

Each pellet was placed in the gelatin crucible with its cylindrical axis vertical and weighed with no magnetic field. The pellet was located about 1 ¾ inches above the centerline of the magnet. The field was applied and the specimen reweighed. This process was repeated for each specimen. The measured weights are given in Table 1 without and with the magnetic field applied.

TABLE 1

Compositions of Sintered Pellets

| Specimen | 1 | 2 | 3 | 4 | 5 |
|---|---|---|---|---|---|
| Wt% $Gd_2O_3$ | 0 | 2.0 | 4.0 | 6.6 | 10.0 |
| Weight (g) (no field) | 1.0185 | 1.0047 | 0.9546 | 1.0019 | 0.9544 |
| Weight (g) (field applied) | 1.0475 | 1.0394 | 0.9961 | 1.0599 | 1.0249 |

The weight increase (in mg increase per g of specimen) is plotted in FIG. 1 as a function of $Gd_2O_3$ content. This can be approximated as a straight line capable of being used as a calibration standard for the particular experimental device described above.

EXAMPLE 6

Powder specimens were prepared by mixing $UO_{2.1}$ and $Gd_2O_3$ powders in proper proportions to give 0, 3.14 and 10 weight percent gadolinia with the balance being urania. The powders were placed into the gelatin capsules and weighed without and with the application of the magnetic field as in Examples 1–5. The weight increases for the respective specimens were 32.5, 43.3 and 76.5 mg/g. These three points fall above the line shown in FIG. 1. This small difference can be attributed to the lower density of the powder specimens (15 percent of theoretical density of a solid for these powders versus 95 percent of theoretical density for Examples 1–5) which gives different average positions of the specimens in the magnetic field.

EXAMPLE 7

Figure 2:
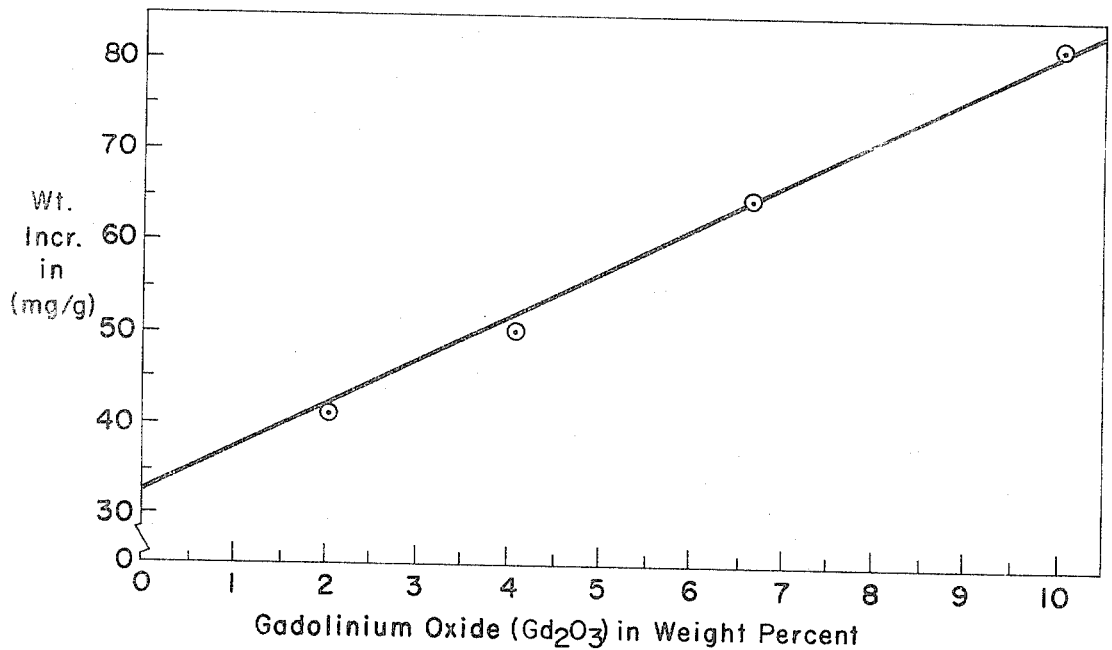
FIG. 2 is a graph presenting the weight change caused by a magnetic field for uranium dioxide pellets containing gadolinium enclosed in a zircaloy-2 cladding.

The same procedure as outlined in Examples 1–5 was followed but with each pellet weighed after being inserted into a hollow cylindrical tube of Zircaloy-2. The Zircaloy-2 cylinder was 1.016 cm in height, with an inside diameter of 0.666 cm and a wall thickness of 0.025 cm. The cylinder was open-ended, and when empty, the Zircaloy-2 cylinder showed no response (approximately less than 2 mg) to the magnetic field. Table 2 lists the weight of each pellet in the Zircaloy cylinder without and with application of the magnetic field. Weights were measured only once, except that the Gd$_2$O$_3$-free pellet was reweighed after the other pellets were weighed. The weight gain in milligrams (per gram of sample) is shown in FIG. 2. The slopes of the lines in FIGS. 1 and 2 are parallel, but displaced slightly. This may be due to slight changes in the gelatin crucible location between experiments, or to a small paramagnetic contribution from the cladding. It is interesting to note that the specimen containing 4 weight percent Gd$_2$O$_3$ falls below the best-fit straight line in both figures; this suggests that the specimen may be lower in Gd$_2$O$_3$ content, probably 3.6 instead of 4.0 weight percent.

TABLE 2

Experimental Data for Clad Pellets

| Specimen | 1 | 2 | 3 | 4 | 5 |
|---|---|---|---|---|---|
| Wt% Gd$_2$O$_3$ | 0 | 2.0 | 4.0 | 6.6 | 10.0 |
| Weight (g) (no field) | 1.129 | 1.114 | 1.065 | 1.112 | 1.064 |
| Weight (g) (field applied) | 1.161, 1.163* | 1.156 | 1.113 | 1.177 | 1.142 |

*Repeat after weighing other specimens

The data in FIGS. 1 and 2 show that measurement of Gd$_2$O$_3$ content to about ± 0.3 weight percent was performed in the experiments described. The weight change sensitivity of the equipment used (about ± 2 mg/g) is well within the capability of rugged and inexpensive balances suitable for routine use by semi-skilled personnel.

EXAMPLE 8

A pellet of sintered UO$_2$ prepared as described previously for Examples 1-5 containing an unknown amount of Gd$_2$O$_3$ was placed in the gelatin crucible. The pellet weighed 1.286 grams and was weighed according to the procedure used in Examples 1-5. The increase in weight for the pellet upon application of the magnetic field was 74.3 mg. This gives a weight increase of 57.8 mg/g and with reference to FIG. 1, the pellet of unknown gadolinium content was determined to contain 6.65 ± 0.3 weight Gd$_2$O$_3$. X-ray fluorescent analysis was used to give a determination that the pellet contained 6.6 ± 0.5 weight percent Gd$_2$O$_3$.

EXAMPLE 9

Figure 3:
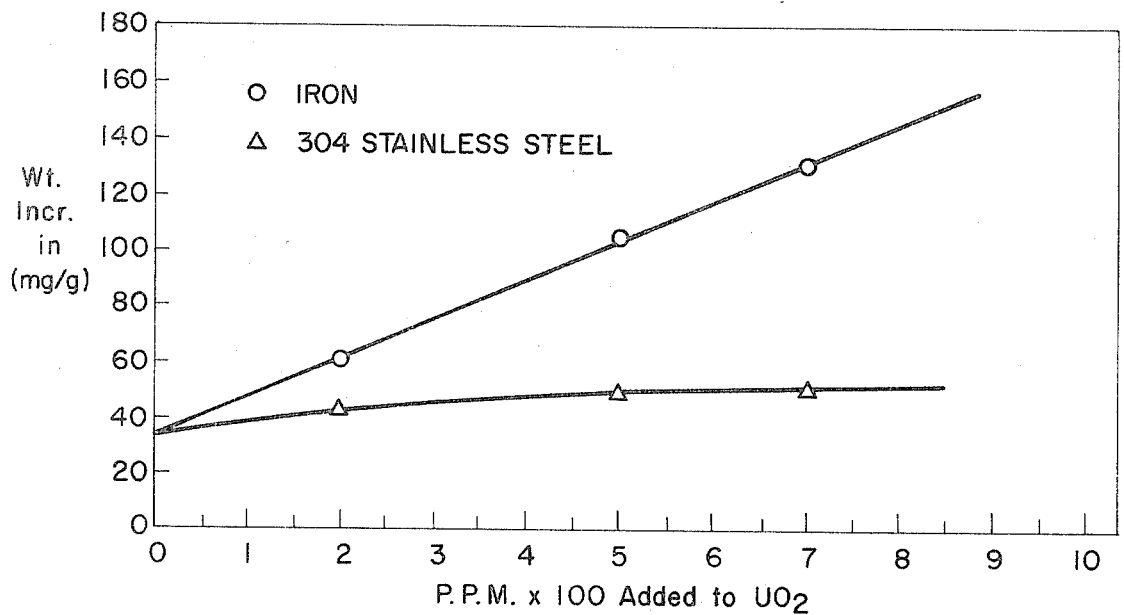
FIG. 3 is a graph presenting the weight caused by a magnetic field for uranium dioxide sintered pellets containing various additions of pure iron and 304 stainless steel.

The same procedure used in Examples 1-5 was followed except that Faraday pole faces were used on the magnet for purposes of establishing a constant force independent of sample size. Sintered uranium dioxide pellets were prepared containing 200, 500 and 700 p.p.m. iron and 200, 500 and 700 p.p.m. 304 stainless steel with each pellet having dimensions of 0.48 inch in height and 0.50 inch in diameter. Weight measurements were taken in a field of 4,100 gauss with a gradient of 5,300 gauss per inch. The weight values for pure iron follow the upper curve shown in FIG. 3 which is approximately linear. The weight values for 304 stainless steel follows the lower curve shown in FIG. 3 which is non-linear.

Normally 304 stainless steel is not detectable by the method of this invention, but by virtue of the heat treatment experienced during sintering of the uranium dioxide structures, a certain amount of ferromagnetic material is precipitated and is detectable by the method of this invention. However the amount of ferromagnetic material precipitated is felt to reach saturation in the uranium dioxide matrix at relatively low levels of concentration.

EXAMPLE 10

Figure 4:
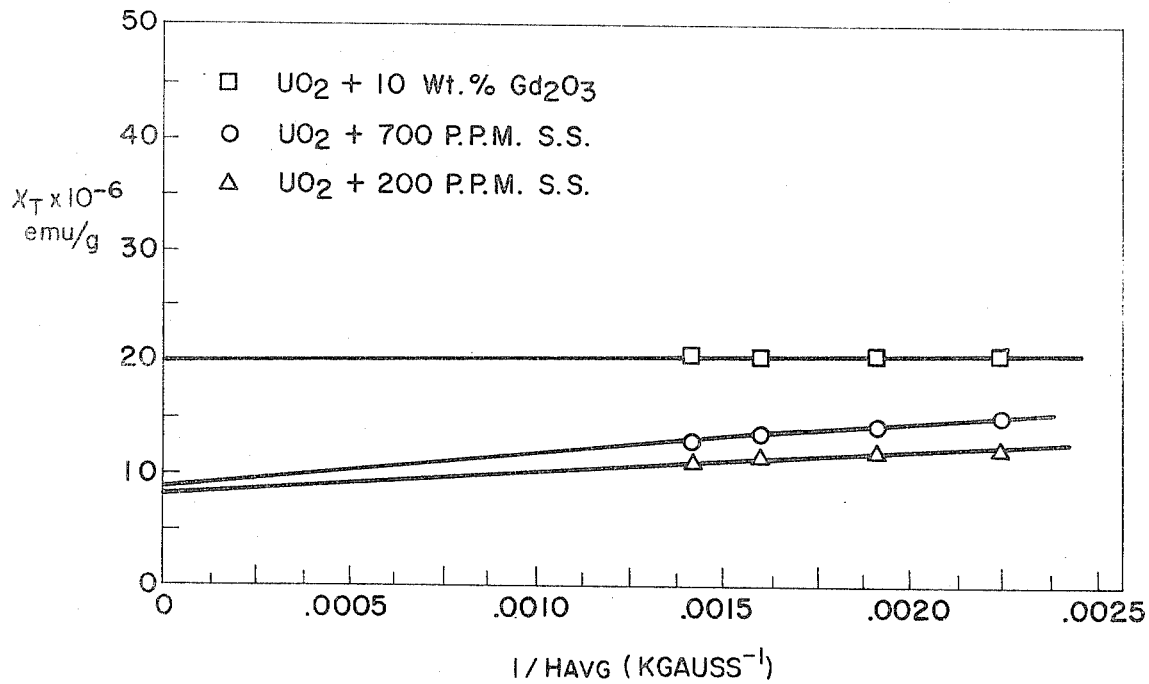
FIG. 4 is a graph showing the effects of a magnetic field on sintered uranium dioxide pellets containing additions of paramagnetic gadolinium oxide and ferromagnetic stainless steel.

The Hinder Owens technique of separating the effects of ferromagnetic materials and paramagnetic materials consists of calculating the measured value of susceptibility at different field strengths using the formula $$F = m\, X_T\, H\, dH/dZ$$

where $F$ is the force exerted by the magnetic field, $m$ is the mass of the sample, $X_T$ is the total susceptibility and $H$ is the vertical field strength and $dH/dZ$ is the vertical field gradient. The total susceptibility $X_T$ is also given by $$X_T = X_P + C/H$$

where $X_P$ is the susceptibility of the paramagnetic component and $C$ is a constant proportional to the mass of paramagnetic material present. Thus a plot of $X_T$ versus $1/H$ yields an intercept of $X_P$ and a slope dependent on the amount of ferromagnetic material present. This plot gives the extrapolation of the total susceptibility to high fields (e.g., low values of $1/H$) and yields the pure paramagnetic contribution. This technique requires complete magnetic saturation of the ferromagnetic component and this experiment was not conducted to complete saturation so that linear extrapolations were used for the lower values of $1/H$. FIG. 4 presents the measurements for three samples containing the noted additions of gadolinium oxide and stainless steel. This figure shows a positive slope for the sample containing the ferromagnetic additions but a zero slope for the sample containing gadolinium oxide. This example illustrates the separation of a ferromagnetic response from a paramagnetic response.

Although specific compositions and proportions have been described in the foregoing examples, other suitable compositions and components may be used as indicated previously with similar results. Other modifications and ramifications of the present invention will occur to those skilled in the art upon reading the present disclosure. These are intended to be included within the scope of this invention as set forth in the following claims.

What is claimed is:

1. The method for the non-destructive, qualitative and quantitative detection of an additive having a magnetic response in nuclear fuel material comprising the steps of
   a. weighing the nuclear fuel material,
   b. weighing the nuclear fuel material disposed in a magnetic field,
   c. determining the change in weight of the specimen in the presence of a magnetic field, and
   d. comparing the change in weight with a calibration of weight changes for known additions of said additive.

2. The method of claim 1 in which the nuclear fuel material is a compound selected from the group consisting of compounds of uranium, plutonium, thorium and mixtures thereof.

3. The method of claim 2 in which the nuclear fuel material is an oxide compound.

4. The method of claim 2 in which the nuclear fuel material is a carbide compound.

5. The method of claim 2 in which the nuclear fuel material is a uranium compound.

6. The method of claim 1 in which the additive contains gadolinium.

7. The method of claim 1 in which the additive is gadolinium oxide.

8. The method of claim 1 in which the additive is plutonium.

9. The method of claim 1 in which the magnetic field is at least about 2,500 gauss.

10. The method of claim 1 in which the additive is iron.

* * * * *

UNITED STATES PATENT OFFICE
CERTIFICATE OF CORRECTION

Patent No. 3,787,761    Dated 22 January 1974

Inventor(s) L. N. Grossman et al

It is certified that error appears in the above-identified patent and that said Letters Patent are hereby corrected as shown below:

Column 3, line 24, "zircaloy-fuel" should be --nuclear-fuel--; and line 25, "ziecaloy-2" should be --zircaloy-2--. Column 8, line 42, after "additions" insert --of stainless steel--.

Signed and sealed this 29th day of October 1974.

(SEAL)
Attest:

McCOY M. GIBSON JR.
Attesting Officer

C. MARSHALL DANN
Commissioner of Patents